(12) United States Patent
Urbanek et al.

(10) Patent No.: US 11,087,629 B2
(45) Date of Patent: Aug. 10, 2021

(54) SYSTEMS AND METHODS FOR PRIORITIZED FLIGHT DATA TRANSMISSION

(71) Applicant: Honeywell International Inc., Morris Plains, NJ (US)

(72) Inventors: Pavel Urbanek, Brno (CZ); Miroslav Krupa, Brno (CZ); Lukas Harvanek, Syrovice (CZ); Michal Cermak, Brno (CZ)

(73) Assignee: Honeywell International Inc., Charlotte, NC (US)

(*) Notice: Subject to any disclaimer, the term of this patent is extended or adjusted under 35 U.S.C. 154(b) by 207 days.

(21) Appl. No.: 16/360,581

(22) Filed: Mar. 21, 2019

(65) Prior Publication Data
US 2020/0302801 A1 Sep. 24, 2020

(51) Int. Cl.
*G08G 5/00* (2006.01)
(52) U.S. Cl.
CPC .................. *G08G 5/0013* (2013.01)
(58) Field of Classification Search
CPC .............................. G08G 5/0013; G07C 5/008
USPC ........................................................ 701/120
See application file for complete search history.

(56) References Cited

U.S. PATENT DOCUMENTS

| | | | |
|---|---|---|---|
| 4,646,241 A | 2/1987 | Ratchford et al. | |
| 2011/0246002 A1* | 10/2011 | Shavit | G08G 5/0026 701/14 |
| 2013/0244588 A1 | 9/2013 | Pereira | |
| 2017/0178420 A1 | 6/2017 | Byrd, Jr. | |
| 2018/0205658 A1* | 7/2018 | Sullivan | H04W 4/42 |

FOREIGN PATENT DOCUMENTS

| | | |
|---|---|---|
| AU | 2013324330 C1 | 2/2017 |
| WO | 0007126 A1 | 2/2000 |
| WO | 2003101831 A2 | 12/2003 |

* cited by examiner

*Primary Examiner* — Gertrude Arthur Jeanglaude
(74) *Attorney, Agent, or Firm* — Bookoff McAndrews, PLLC (57) ABSTRACT

A computer-implemented method for prioritized flight data transmission includes receiving a frame of flight data from one or more aircraft data sensors, the frame of flight data comprising a plurality of parameters collected from one or more avionics systems, associating each parameter of the plurality of parameters with a respective priority level, decomposing the frame of flight data into a plurality of flight data frame layers, wherein each flight data frame layer of the plurality of flight data frame layers comprises a subset of the plurality of parameters having respective priority levels that are equivalent, and transmitting, to a ground station, a first flight data frame layer of the plurality of flight data frame layers comprising parameters having a highest respective priority level.

20 Claims, 10 Drawing Sheets

SYSTEMS AND METHODS FOR PRIORITIZED FLIGHT DATA TRANSMISSION

TECHNICAL FIELD

Various embodiments of the present disclosure relate generally to the field of flight data processing and, more particularly, to prioritized flight data transmission.

BACKGROUND

Many aircraft, including most commercial aircraft, are equipped with flight data recorders (FDRs) and cockpit voice recorders (CVRs). These recorders are often combined in a single unit commonly referred to as the "black box" or "flight recorder." The FDR records the recent history of a flight through numerous parameters collected several times per second. The CVR records the sounds in the cockpit, including the conversation of the pilots. These recordings are often used to understand the circumstances of an accident or other event under investigation. However, recovery of the data recorded by the FDR and CVR requires that the recorders be located and recovered after an incident, and that the recorded data is not damaged in an incident. Such recovery may be difficult or impossible in some circumstances, such as due to a crash of an aircraft in a deep ocean environment. Furthermore, the recorded data cannot be accessed until after the recorders have been recovered, thus preventing safety or support personnel on the ground from accessing the real-time data to better understand the condition of the aircraft or an incident in progress. One or more of these concerns may be addressed by streaming flight data in real time to a ground station. However, such real-time transmissions may incur significant monetary costs, such as airtime or data transmission fees for satellite networks. In addition, the bandwidth available for data transmission may be limited and may vary based on location, altitude and other factors. The large volume of flight data available for recording or transmission may overwhelm this available data bandwidth, resulting in lost or delayed data.

The present disclosure is directed to overcoming one or more of these above-referenced challenges.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the present disclosure, systems and methods are disclosed for prioritized flight data transmission.

In one embodiment, a computer-implemented method is disclosed for prioritized flight data transmission, the method comprising: receiving a frame of flight data from one or more aircraft data sensors, the frame of flight data comprising a plurality of parameters collected from one or more avionics systems, associating each parameter of the plurality of parameters with a respective priority level, decomposing the frame of flight data into a plurality of flight data frame layers, wherein each flight data frame layer of the plurality of flight data frame layers comprises a subset of the plurality of parameters having respective priority levels that are equivalent, and transmitting, to a ground station, a first flight data frame layer of the plurality of flight data frame layers comprising parameters having a highest respective priority level.

In accordance with another embodiment, a system is disclosed for prioritized flight data transmission, the system comprising: a communication module; and a real-time access recorder (RTAR) comprising: a data storage device storing instructions for prioritized flight data transmission in an electronic storage medium, and a processor configured to execute the instructions to perform a method including: receiving a frame of flight data from one or more aircraft data sensors, the frame of flight data comprising a plurality of parameters collected from one or more avionics systems, associating each parameter of the plurality of parameters with a respective priority level, decomposing the frame of flight data into a plurality of flight data frame layers, wherein each flight data frame layer of the plurality of flight data frame layers comprises a subset of the plurality of parameters having respective priority levels that are equivalent, and transmitting, to a ground station, a first flight data frame layer of the plurality of flight data frame layers comprising parameters having a highest respective priority level.

In accordance with another embodiment, a computer-implemented method is disclosed for prioritized flight data transmission, the method comprising: receiving a first flight data frame layer and a second flight data frame layer, and forming a flight data frame by combining the received first flight data frame layer and the received second flight data frame layer.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to prioritized flight data transmission.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Any suitable system infrastructure may be put into place to allow prioritized flight data transmission. The accompanying drawings and the following discussion provide a brief, general description of a suitable computing environment in which the present disclosure may be implemented. In one embodiment, any of the disclosed systems, methods, and/or graphical user interfaces may be executed by, or implemented by, a computing system consistent with, or similar to, that depicted in the accompanying drawings. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, network PCs, minicomputers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 1:
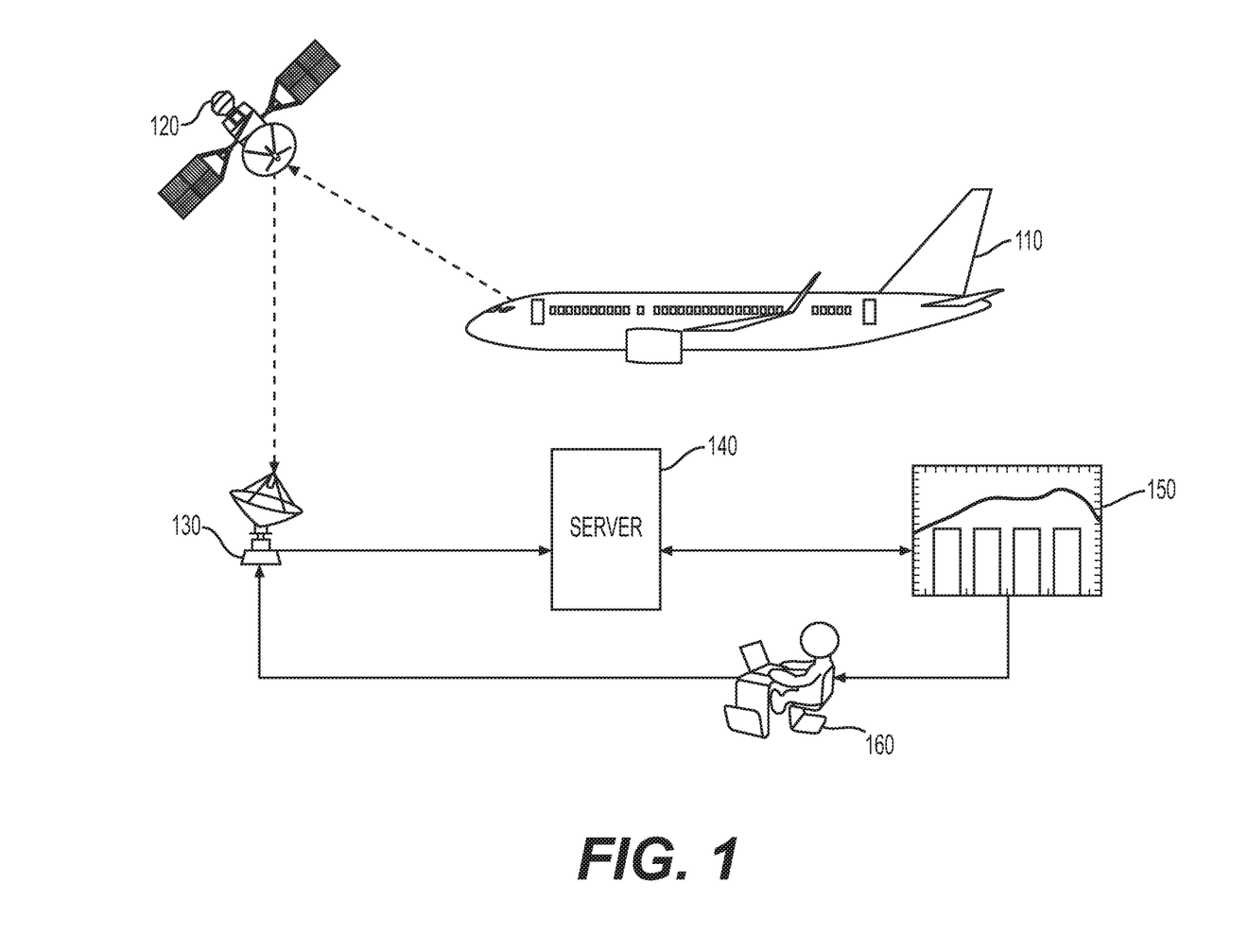
FIG. 1 depicts an exemplary operating environment for prioritized flight data transmission, according to one or more embodiments.

FIG. 1 depicts an exemplary operating environment for prioritized flight data transmission, according to one or more embodiments. As shown in FIG. 1, flight data systems aboard an aircraft 110 may stream flight data to a ground station 130 by way of a satellite 120. Ground station 130 may then transmit the flight data to one or more servers 140, where it may be stored for further processing. Although data transmission via satellite is depicted in FIG. 1, it is to be understood that other means of data transmission may be employed. For example, flight data may be streamed from aircraft 110 to ground station by way of a cellular data network, a direct radio connection, or other wireless network. Such alternate means of data transmission may stream the flight data directly to server 140 rather than by way of ground station 130. Server 130 may store and maintain data received from multiple aircraft across a fleet of aircraft. The data stored on server 130 may be used to provide analytics 150 to aircraft or fleet operators, such as, for example, flight operational quality assurance (FOQA), flight data monitoring (FDM), flight data analysis (FDA), maintenance operational quality assurance (MOQA), flight condition alarms, distress events, etc. Analytics 150 may be used by safety personnel 160 to monitor the flight status, transmit commands to, for example, aircraft 110, flight crew, the aircraft data systems, etc., request additional information from, for example, server 130, aircraft 110, the aircraft data systems, etc., or perform regular maintenance of a cockpit voice recorder/flight data recorder (CVRFDR).

Figure 2A:
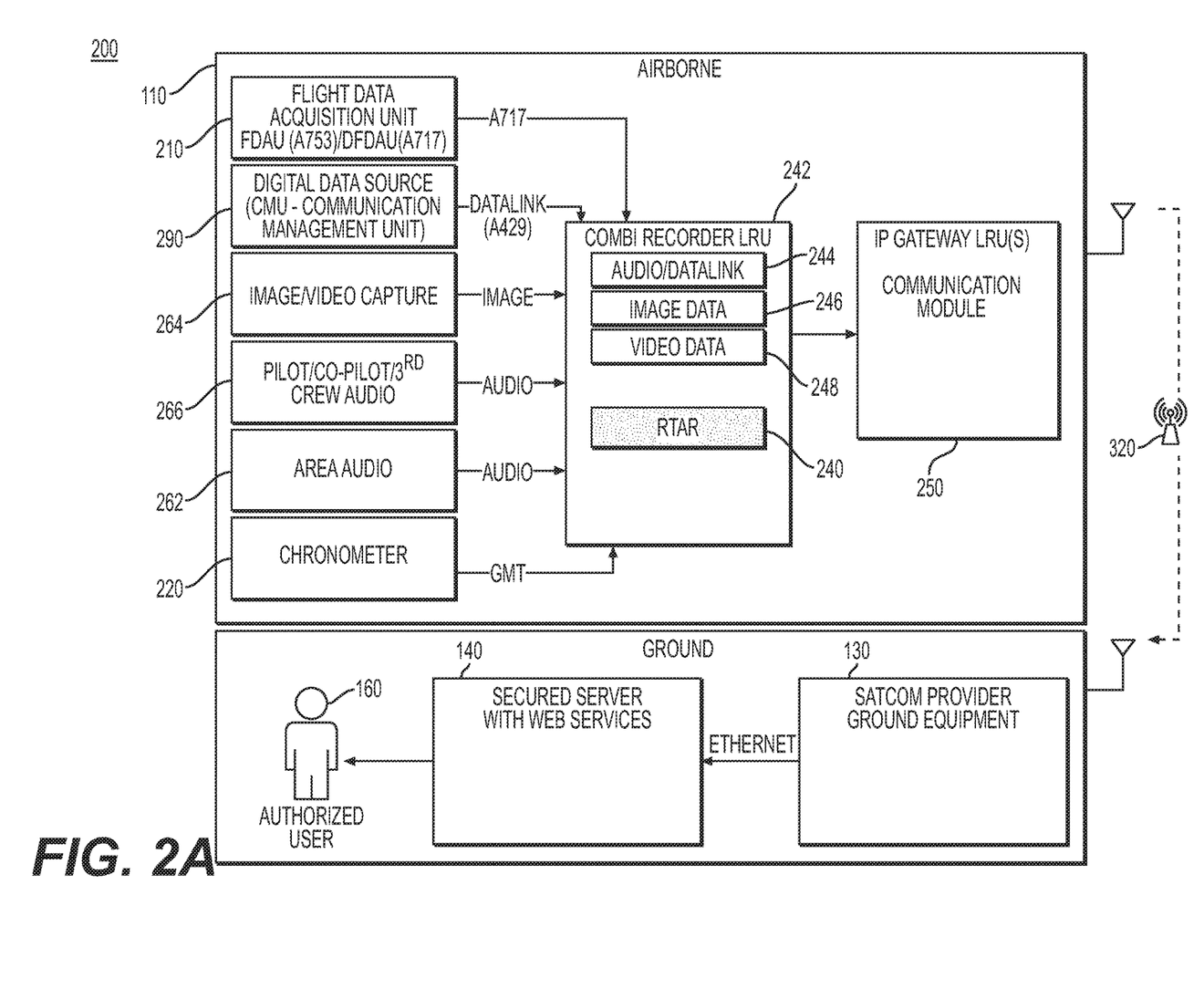
FIGS. 2A and 2B depict exemplary system infrastructures for prioritized flight data transmission, according to one or more embodiments.
Figure 2B:
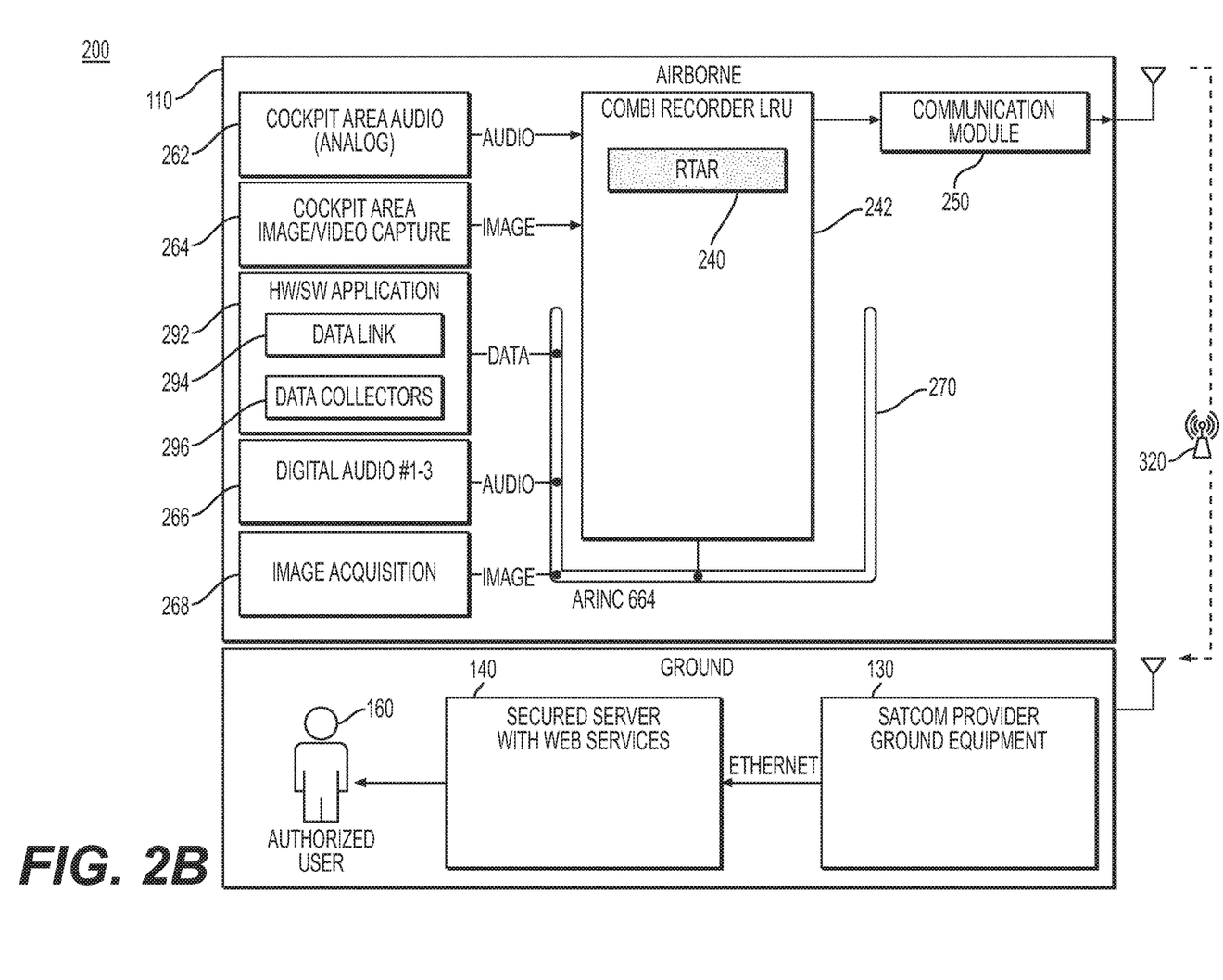

FIGS. 2A and 2B each depict a schematic overview of exemplary system infrastructures for prioritized flight data transmission 200, according to one or more embodiments. As shown in FIG. 2A, aircraft flight data may include, for example, digital flight data provided by flight data acquisition unit 210, aircraft avionics data provided communications management unit 290, image and video data provided by image/video capture unit 264, pilot and crew audio data 266, cockpit area audio data 262, chronometer data 220, etc. Aircraft data may be provided to a combination recorder line replaceable unit (LRU) 242. Combination recorder 242 may include, for example, storage for audio and datalink data 244, image data 246, and video data 248. Combination recorder 242 may further include a real-time access recorded (RTAR) 240.

In an alternative embodiment, as shown in FIG. 2B, digital flight data, such as, for example, digital image data 268, pilot and crew audio data 266, and additional digital data provided by hardware/software application 292, including data link 292 and data collectors 294, may be provided to combination recorder 242 by way of an digital data network or bus, such as an ARINC 664 network depicted in FIG. 2B. However, other digital data sources may be provided, and other combinations of direct links to combination recorder 242 and digital data networks or buses may be employed.

RTAR 240 may have direct access to aircraft data, audio, and video data provided to combination recorder 242. The functions provided by RTAR 240 may be host platform independent and, in alternative embodiments, could be hosted in various LRUs depending on available CPU/RAM resources of the LRU. For example, RTAR 240 may be hosted in a satellite communication terminal (SATCOM), a flight data recorder (FDR) or cockpit voice recorder/flight data recorder (CVRFDR), a digital flight data acquisition unit (DFDAU), a quick access recorder (QAR) unit, such as a streaming QAR. RTAR 240 may be configured to stream compressed or uncompressed data stream comprising any or all of the data sources depicted in FIGS. 2A and 2B. However, additional data streams may be also be available. RTAR 240 may be configured to parse frames of streamed data down to the parameters level in order to possibly reduce the bandwidth of streamed data. RTAR 240 may be remotely configurable, such as by safety or support personnel on the ground. RTAR 240 may be configured to differentiate parameters of streamed data, and to create multiple data streams. For example, aircraft data may be streamed over secured satellite transmission, while cockpit camera/audio data may be encrypted and streamed over a radio transmission, such as by $K_a$ band. RTAR 240 may be configured to provide enhanced cyber security and data protection to ensure data is properly encrypted.

Figure 3:
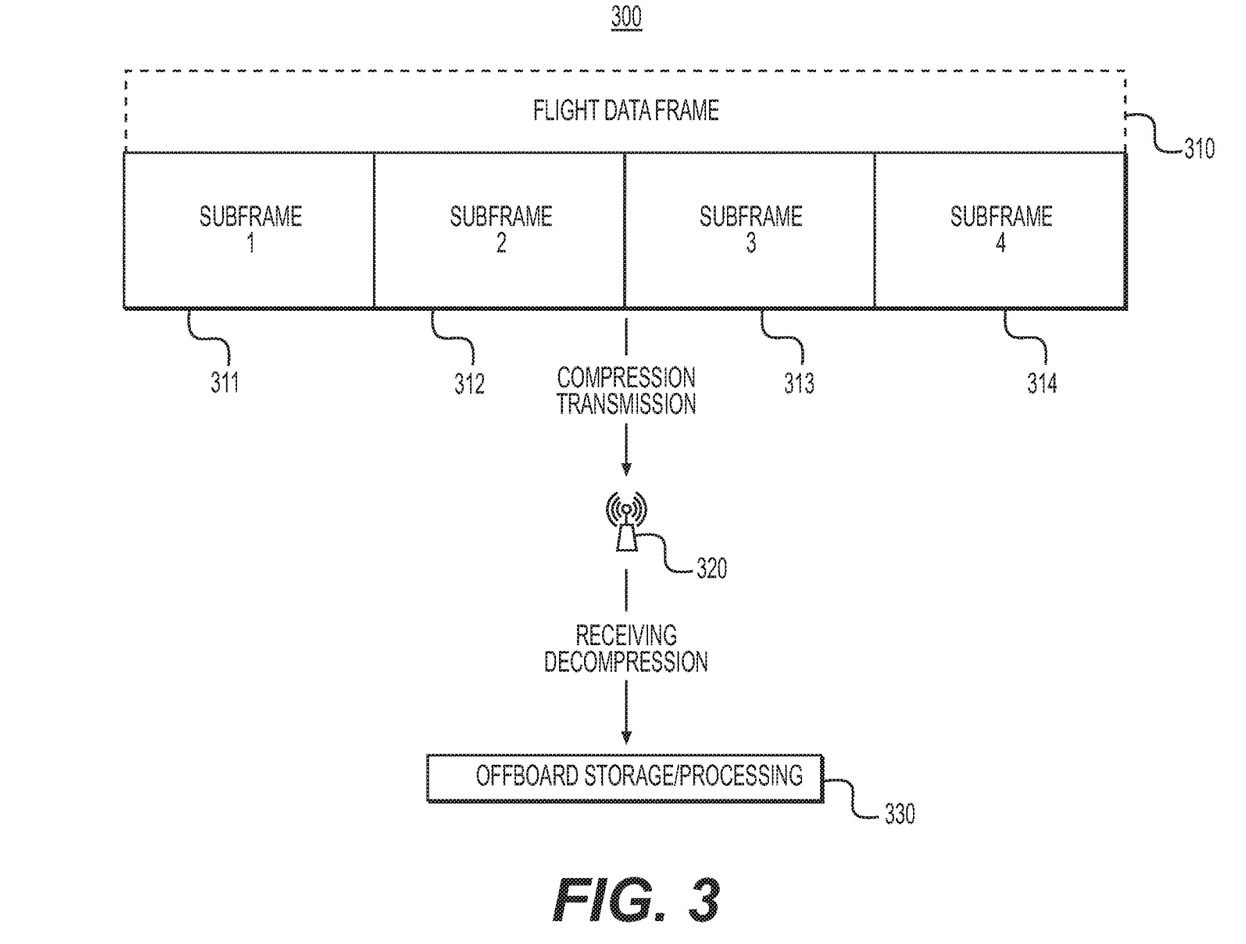
FIG. 3 depicts a block diagram of a method of prioritized flight data transmission, according to one or more embodiments.

FIG. 3 depicts a block diagram of a method of flight data transmission, according to one or more embodiments. As shown in FIG. 3, flight data records may be provided as frames of data, such as data conforming to the Aeronautical Radio, Incorporated (ARINC) standard 717, each data frame possibly including multiple subframes. For example, flight data frame 310 may include subframes 311-314. Frames may be transmitted at regular periodic intervals, or may be transmitted as needed based on the rate of flight data generation and the available bandwidth for flight data transmission. Each subframe 311-314 may include individual parameters encoded in binary form. The arrangement of the parameters in subframes 311-314 may be according to a parameter map, such as, for example, a parameter map documented in a flight recorder electronic documentation (FRED) file. Each frame 310 may undergo compression and transmission over wireless data link 320, such as by way of satellite 120, before being received and decompressed, such as at ground station 130. The received and decompressed frame 310 may be saved to offboard storage 330 for further processing, such as by one or more servers 140.

Figure 4:
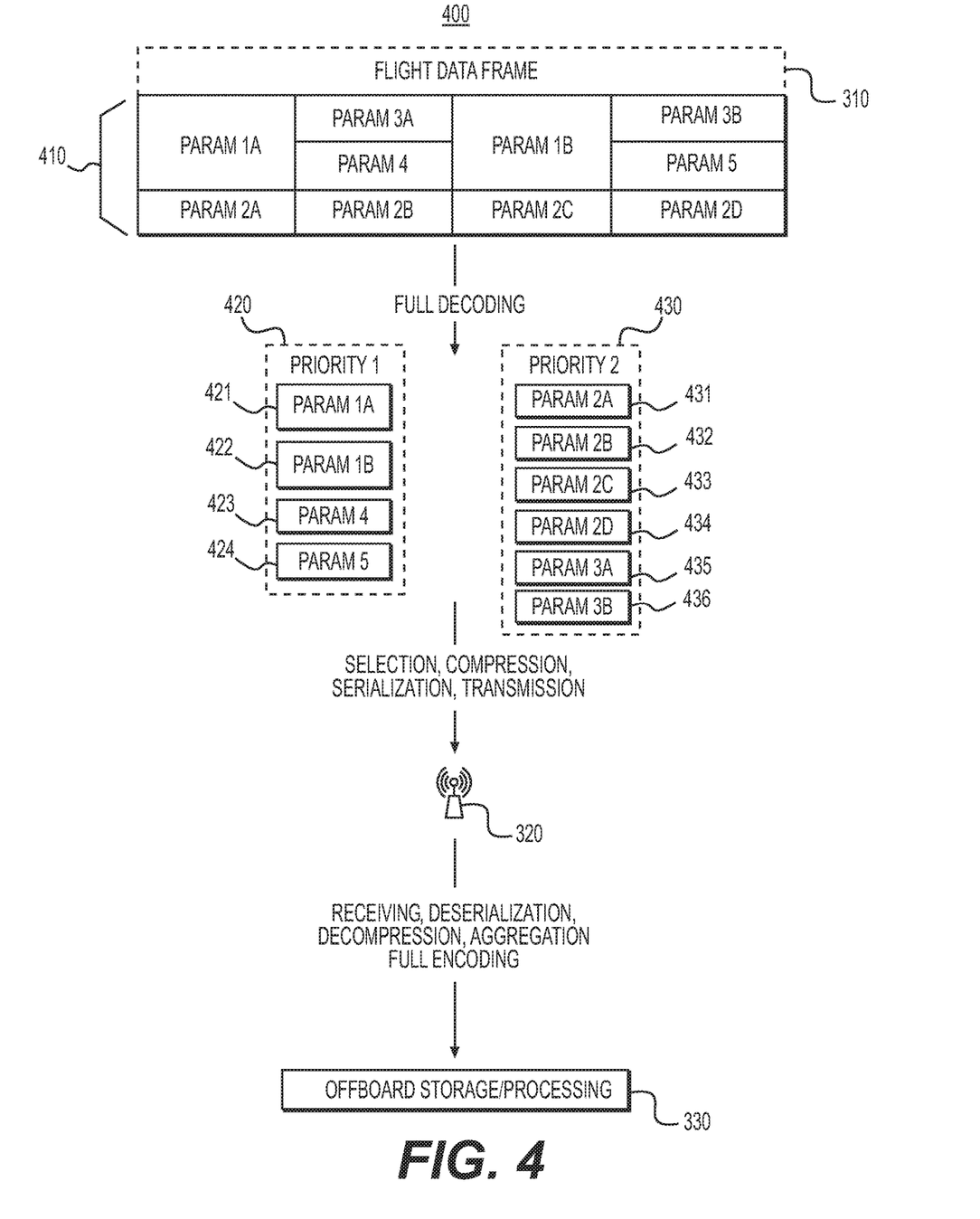
FIG. 4 depicts a block diagram of a method of prioritized flight data transmission, according to one or more embodiments.

The method according to FIG. 3 may result in all data of each frame being transmitted. However, as discussed above, the amount of data to be transmitted may result in high monetary costs or lost or delayed data. FIG. 4 depicts a block diagram of a method of prioritized flight data transmission, according to one or more embodiments, to address these concerns. As shown in FIG. 4, each frame 310 may include a number of parameters 410. Frame 310 may be decoded into the values for each individual parameter 410. Each parameter 410 may be designated with a priority level indicating which parameters are most important for transmission. The highest priority level may include parameters that are considered mandatory for transmission. The priority level may be specified, for example, in a FRED file, such as under the Additional Information tag, as parameters to software performing the decoding, as other external documentation, etc. For example, the priority information for each individual parameter could be provided additionally as a configuration file with a simple two attribute [parameter id, priority] table. Such a configuration file may be embodied, for example, as a software loadable database (SLDB), allowing for the prioritization and streaming instructions to be customized according to the needs of the end user without modification of the software operating the RTAR or other aircraft components. This may allow the streaming and prioritization to be updated without the expense and delay of re-certifying the software.

Once decoded, the parameter values may be combined into parameter blocks according to the priority levels. For example, parameters having the highest priority level, "priority 1" parameters, may be serialized and combined in a first parameter block 420 comprising parameters 421-424. Similarly, parameters having the second highest priority level, "priority 2" parameters, may be serialized and combined in a second parameter block 430 comprising parameters 431-436. Although two priority levels are depicted in FIG. 4, it is to be appreciated that any number of priority levels may be specified according to the needs of a particular embodiment. Each parameter block 420 and 430 may undergo compression and transmission over wireless data link 320, such as by way of satellite 120, before being received and decompressed, such as at ground station 130. The received and decompressed parameter blocks 420 and 430 may be deserialized, aggregated, and re-encoded into a new data frame 310. The new data frame 310 may be saved to offboard storage 330 for further processing, such as by server 140. One or more lower-priority parameter blocks, such as parameter block 430, might not be transmitted in order to conserve bandwidth. In such a case, the re-encoded new data frame may include gaps where the lower-priority parameters would be stored. Alternatively, in one or more embodiments, each parameter block 420 and 430 may be transmitted by different means in order to reduce bandwidth on communication on channels having a high cost. For example, the highest priority or mandatory parameter blocks may be transmitted through a secured low latency L-band satellite communication channel, and less critical low-priority parameter blocks may be transmitted through Ka-band/cellular (LTE) channel with a reduced service coverage area but lower data cost.

A prioritized flight data transmission method according to the method of FIG. 4 might not be able to verify that parameter values were not modified or degraded during the decoding, serialization, compression, decompression, deserialization, and re-encoding process. In addition, outdated, inaccurate, or missing FRED documentation may make it difficult to correctly identify and extract parameters 410. FIGS. 5-8 depict alternative embodiments to address these issues.

Figure 5:
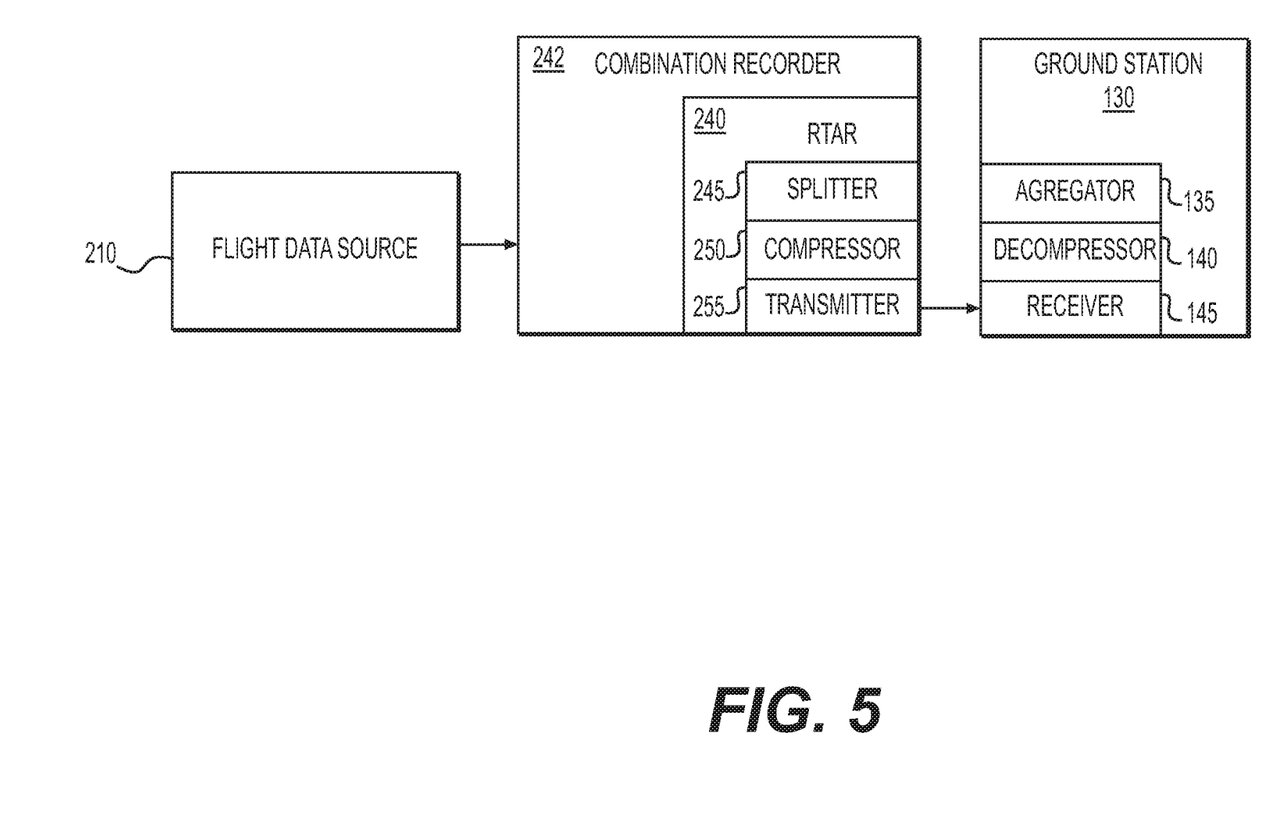
FIG. 5 depicts a block diagram of a system for prioritized flight data transmission, according to one or more embodiments.

FIG. 5 depicts a block diagram of a system for prioritized flight data transmission, according to one or more embodiments. Methods of prioritized flight data transmission, according to one or more embodiments, may be performed by components of combination recorder LRU 242, depicted in FIGS. 2A and 2B, and ground station 130 depicted in FIG. 1. FIG. 5 depicts an example block diagram of these components. As shown in FIG. 5, combination recorder LRU 242 may receive flight data from a flight data source. combination recorder LRU 242 may include RTAR 240 comprising splitter 245 to generate parameter blocks according to priority levels of the parameters, compressor 250 to compress each generated parameter block, and transmitter 255 to transmit each parameter block to ground station 130. Ground station 130 may include receiver 145 to receive each parameter block from RTAR 240, decompressor 140 to decompress each received parameter block 420 and 430, and aggregator 135 to aggregate each received parameter block into a new data frame 310.

Figure 6:
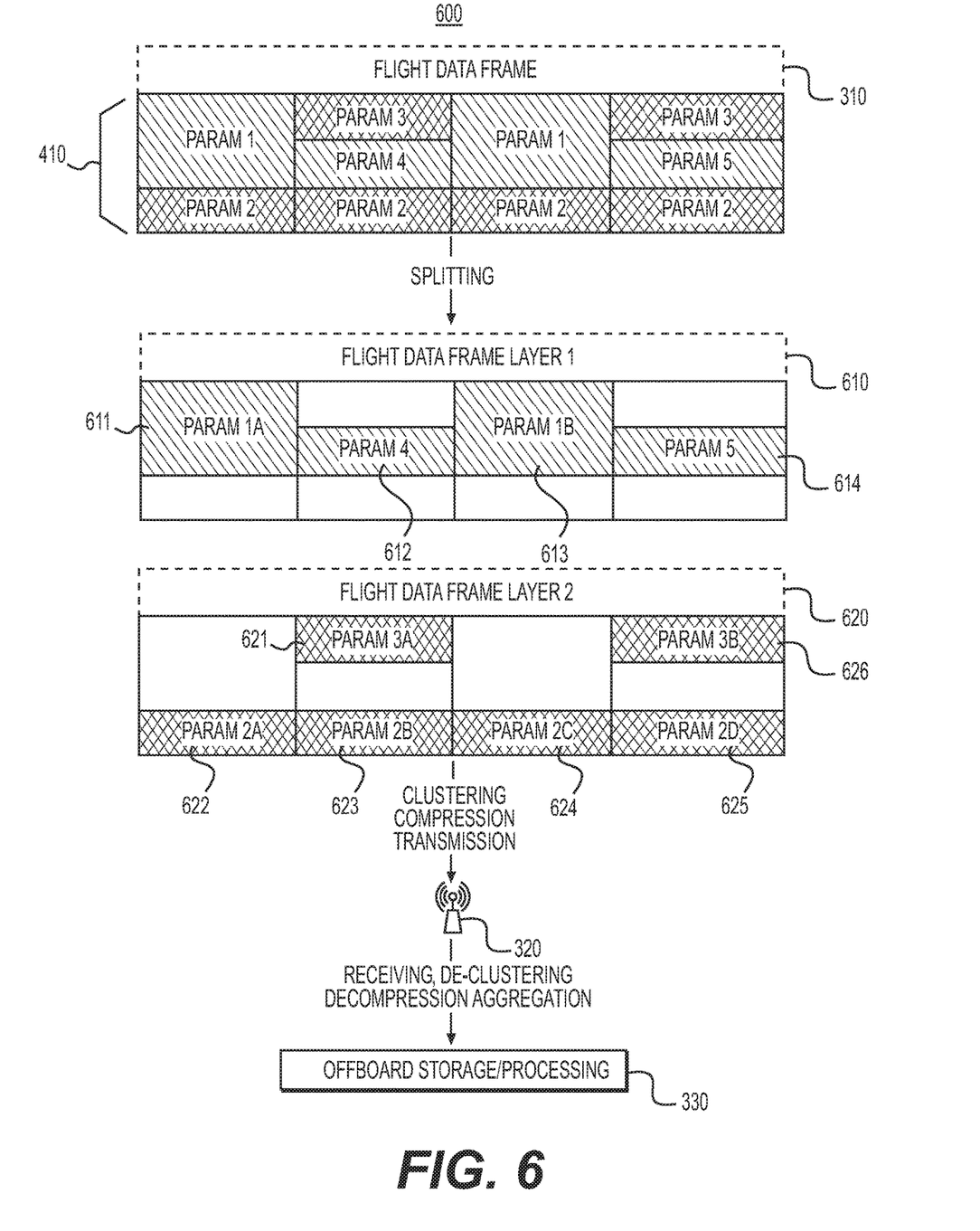
FIG. 6 depicts a block diagram of a method of prioritized flight data transmission, according to one or more embodiments.

FIG. 6 depicts a block diagram of a method of prioritized flight data transmission, according to one or more embodiments. As shown in FIG. 6, each frame 310 may include a number of parameters 410, and each parameter 410 may be designated with a priority level indicating which parameters are most important for transmission. For ease of understanding, FIG. 6 depicts the priority level of each parameter as a background pattern: diagonal lines for the highest priority parameters and crosshatch for lower-priority parameters. Data frame 310 may then be split according to the parameter priority levels into multiple data frame layers, such as data frame layer 1 (610) and data frame layer 2 (620) depicted in FIG. 6. For example, data frame layer 1 (610) may include highest priority parameters 1A (611), 4 (612), 1B (613), and 5 (614), while data frame layer 2 (620) may include lower priority parameters 3A (621), 3B (626), 2A (622), 2B (623), 2C (624), and 2D (625). Such splitting may be performed, for example, by splitter 245 of RTAR 240 depicted in FIG. 5. As shown in FIG. 6, the arrangement of the parameters in each data frame layer may be the same as in data frame 310. That is, empty space may be provided in place of the parameters not included in the data frame layer. The empty space may be filled with binary zeroes, alphanumeric blank characters, or any other pattern according to the needs of a particular embodiment. Splitting the data frame in this manner may avoid a process of decoding and re-encoding each parameter and, thus, may ensure that the parameters are provably protected from corruption or alteration. In one embodiment, each data frame layer may be generated by applying a binary mask to data frame 310, in which the binary mask includes binary zeroes in regions corresponding to parameters not appearing in the data frame layer. The binary mask may be applied to data frame 310 by way of a bitwise AND operation. Although two priority levels are depicted in FIG. 6, it is to be appreciated that any number of priority levels may be specified according to the needs of a particular embodiment. Each data frame layer 1 (610) and data frame layer 2 (620) may undergo compression and transmission over wireless data link 320, such as by way of satellite 120, before being received and decompressed, such as at ground station 130. Information indicating the priority levels may be supplied within a header wrapped around the transferred data frame layers. The priority level information may be encoded so as to minimize the size of the additional transmitted data. For example 256 levels of priority may be encoded in a single Byte value. If a bandwidth limit would cause some lower priority data frame layers not to be transmitted, an empty data frame layer may be substituted. Information of such missing data frame layers may be provided to decoding algorithms in order to identify missing low priority parameters. The received and decompressed data frame layer 1 (610) and data frame layer 2 (620) may then be aggregated into a new data frame 310, such as by aggregator 135 of ground station 130 depicted in FIG. 5. For example, the lower-priority parameters of data frame layer 2 (620) may simply be copied into the corresponding empty spaces of data frame layer 1 (610). In one embodiment, if the empty spaces of data frame layer 1 (610) and data frame layer 2 (620) consist of binary zeroes, the aggregation may be accomplished by a bitwise OR operation across each bit of data frame layer 1 (610) and data frame layer 2 (620). The new data frame 310 may be saved to offboard storage 330 for further processing, such as by server 140. One or more lower-priority parameter blocks, such as parameter block 430, might not be transmitted in order to conserve bandwidth. In such a case, a re-encoded new data frame may include gaps where the lower-priority parameters would be stored.

Figure 7:
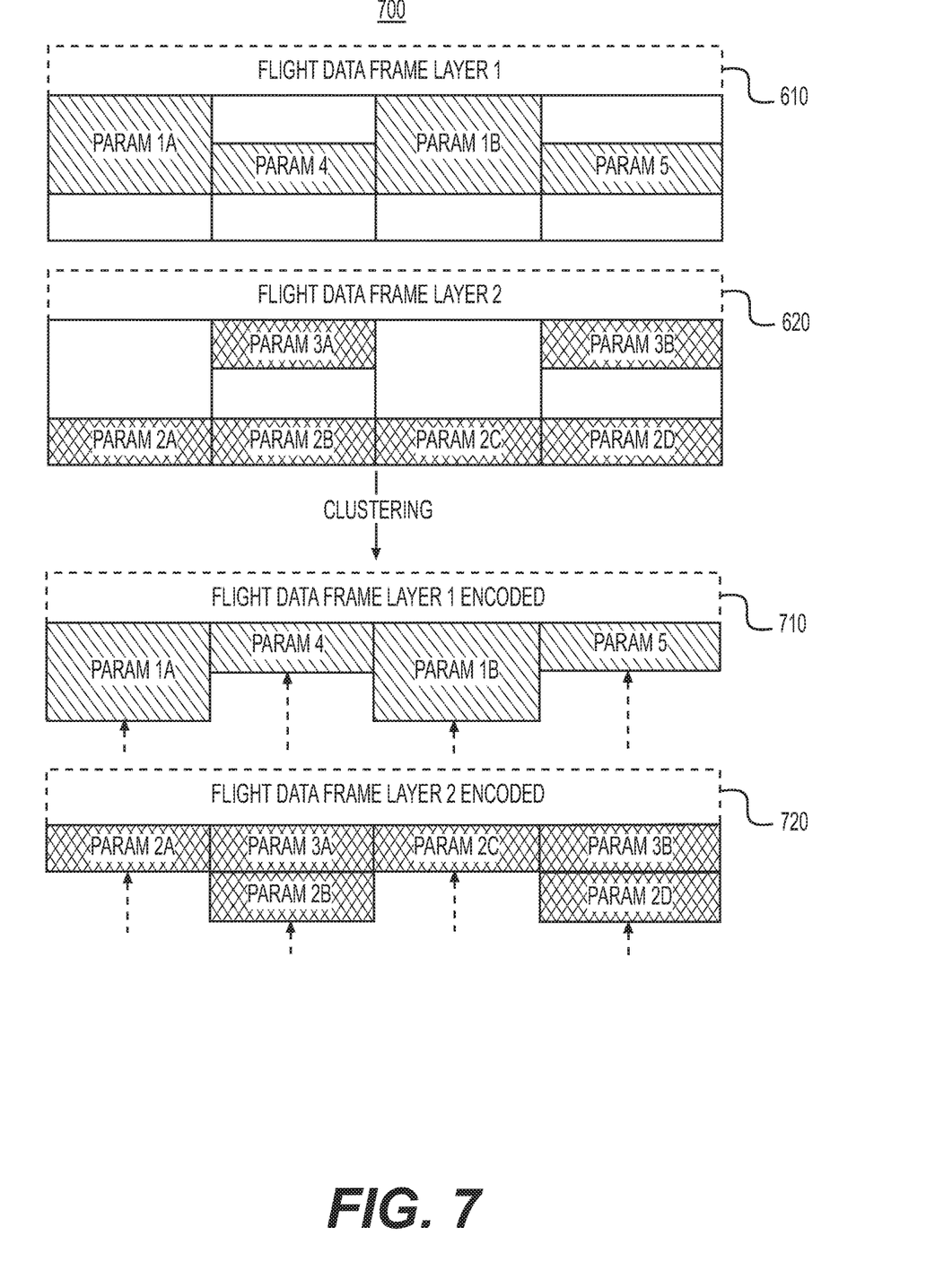
FIG. 7 depicts a block diagram of a method of prioritized flight data transmission, according to one or more embodiments.
Figure 8:
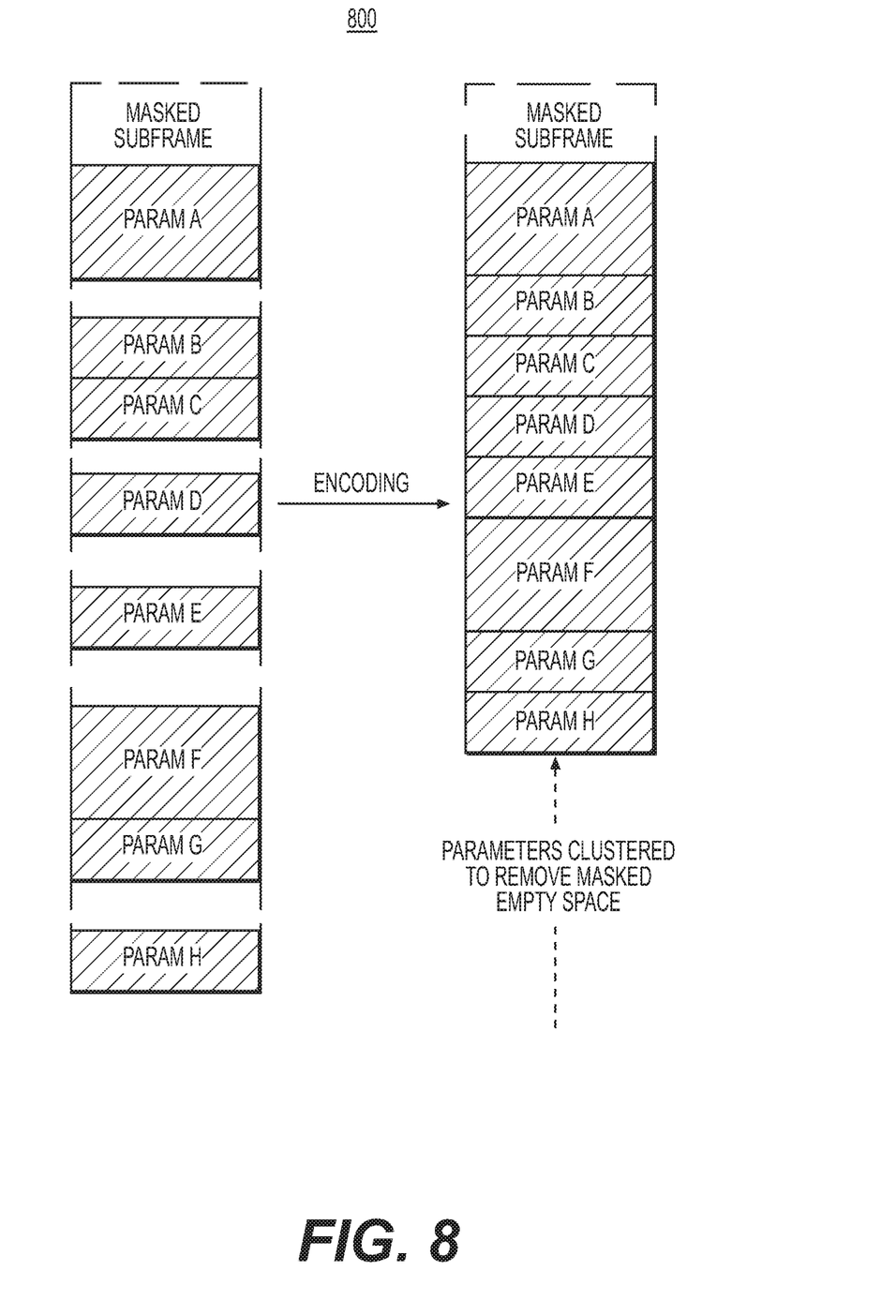
FIG. 8 depicts a block diagram of a method of prioritized flight data transmission, according to one or more embodiments.

FIG. 7 depicts a block diagram of a method of prioritized flight data transmission, according to one or more embodiments. As shown in FIG. 7, after data frame 310 has been split according to the parameter priority levels into multiple data frame layers, such as data frame layer 1 (610) and data frame layer 2 (620), as depicted in FIG. 6, each of data frame layer 1 (610) and data frame layer 2 (620) may be clustered to remove empty space that may be provided in place of the parameters not included in the data frame layer. Such clustering may be performed, for example, by splitter 245 or compressor 250 of RTAR 240, depicted in FIG. 5. As shown in FIG. 7, such clustering may be accomplished by moving each parameter vertically into empty spaces within each of data frame layer 1 (610) and data frame layer 2 (620). In an alternative embodiment depicted in FIG. 8, the parameters in each of data frame layer 1 (610) and data frame layer 2 (620) may be arranged serially without empty space provided in place of the parameters not included in the data frame layer. Such an arrangement of the parameters may provide a clustered data frame payer, as shown in FIG. 8. Such serialization and clustering may be performed, for example, by splitter 245 or compressor 250 of RTAR 240, depicted in FIG. 5.

The allocation of parameters to priority groups, as described above with respect to FIGS. 4-8, may be generic and configurable to satisfy various needs of users. Mandatory parameters may be defined by one or more regulatory agencies, such as the United States Federal Aviation Administration (FAA), the European Aviation Safety Agency (EASE), the Russian Federal Air Transport Agency (FATA), or another national aviation authority (NAA). See, for example, the FAA Code of Federal Regulations (CFR) § 125.226 listing all mandatory parametric groups (http://rgl.faa.gov/regulatory and guidance_library/rgfar.nsf/daa4c54debeb6dca86256f3 400626ab0/e6d6f45289434e30862575ef006cb7fb!OpenDocument).

Those parameter groups could be allocated to priorities based on, for example, the parameters' importance in, e.g., accident investigations, or airline operator needs to have an instant access to the most critical parameters.

The latest generation of FDRs may handle transmission rates of up to 4096 words per second (wps). However, this maximum transmission speed may increase in the future. In one or more embodiments, a mandatory set of parameters may fit, for example, within 512 wps. The ability to record more data might lead to airline operators using the full potential of a current-generation FDR (e.g. 4096 wps). However, the airline operator may want to reduce the size of FDR data being transmitted over SATCOM either due to a technological limit of the network or purely for cost reduction purposes. Without prioritized streaming, either the FDR would not be utilized fully (or multiple ARINC outputs would have to be defined and implemented) or the cost of increased bandwidth would be incurred.

In one example employing available 4096 wps FDRs, the reduction of bandwidth could be over 8 times considering a full 4096 wps recording, with mandatory parameters requiring less than 512 wps. For example, Table 1 shows an overview of streaming data size for different A717 transfer speeds. In Table 1, the transfer speed for the FDR is shown in words per second (wps) for 16-byte words, and the corresponding transmission size in bytes per second and kilobits per second.

TABLE 1

| Transfer speed | A717 | x - multiplier | Size [bytes/s] | Size [kbits/s] |
|---|---|---|---|---|
| FDR 64 wps | 64 | 1 | 1024 | 8 |
| FDR 128 wps | 128 | 2 | 2048 | 16 |
| FDR 256 wps | 256 | 4 | 4096 | 32 |
| FDR 512 wps | 512 | 8 | 8192 | 64 |
| FDR 1024 wps | 1024 | 16 | 16384 | 128 |
| FDR 2048 wps | 2048 | 32 | 32768 | 256 |
| FDR 4096 wps | 4096 | 64 | 65536 | 512 |

An example of transmission for an FDR transmitting an A717 stream at 512 wps is shown in Table 2 to demonstrate how splitting, clustering, and compression of parameters may reduce total streaming bandwidth.

TABLE 2

| FDR 512 wps | % | Size [bytes/s] | Size [kbits/s] | Size [kbits/s] with compression (5:1) |
|---|---|---|---|---|
| Priority 1 | 15% | 1228.8 | 9.6 | 1.92 |
| Priority 2 | 25% | 2048 | 16 | 3.2 |
| Priority 3 | 30% | 2457.6 | 19.2 | 3.84 |
| Priority 4 | 30% | 2457.6 | 19.2 | 3.84 |
| Total | 100% | 8192 | 64 | 12.8 |

As shown in Table 2, Priority 1 parameters may make up 15% of all parameters, Priority 2, 25%, Priority 3, 30%, and priority 4, 30%. In this example, Priority 1 parameters may require a transfer bandwidth of 9.6 kbits/s compared to 64 kbits/s for the full parameter set—a reduction of 85%. Applying a nominal 5:1 compression to the Priority 1 parameters may further reduce the required bandwidth to 1.92 kbits/s, or approximately 3% of the bandwidth for the full uncompressed parameter set.

Techniques presented herein allow for the stratification of data into prioritized sets, for example in the form of ARINC 717 layers, and transmissions of the highest priority data first. For the stratification, there might be no need to decode the parameters to the actual values, in original engineering units, rather the parameter location within the frame may be the only information required. The frames might not need to be broken down to parameters of different binary encoding, rather the data might remain exactly the same. Instead, only the binary transmission order might be changed to achieve priority transmissions of mandatory and/or critical signals.

Techniques presented herein may simplify computational complexity due to the removal of decoding, selection, and re-encoding of the individual parameters. The error resilience may be increased because only a small number of additional information items might be needed from the FRED to create the masks. If the masks are created offboard, they may be verified against the documentation easily, for example by visualization and overlay. The challenge of decoding, interpreting, and re-encoding floating point values without loss of information is avoided, and the issue of a possible rounding/precision error is also avoided. The configuration of onboard software may also be simplified by precomputing and verifying the masks offboard, only the masks would be loaded to the onboard RTAR 240, and the full FRED might not be required. Further, there might not be a need for either reduced output specification or even custom serialization protocol to transfer decoded parameters.

One advantage of such invention lies in the reduced cost of the RTAR 240 device due to the reduced computational power requires, as well as less complex code and related development and maintenance.

Another advantage of techniques described herein is the possible more transparent data flow from the combination recorder 242 to the ground station 130 without intermediate decoding or encoding steps. This may make the process more easily certifiable. The data received on the ground may be guaranteed to be an exact copy of the data stored in the FDR crash-protected memory. Another advantage is that the stream may be configurably reduced to the minimum mandatory set of parameters if desired, including if the connectivity does not allow larger bandwidth transmissions. This may reduce continuous costs greatly. Further, the operation cost may be reduced on configuration procedures, as only a simplified priority specification might be required to generate the masks.

Further, techniques presented herein may be selectively implemented based upon a determined bandwidth. For example, if the bandwidth is above a threshold, all CVRFDR data might be transmitted to ground station 130. However, if the bandwidth falls below a predetermined threshold, data may be split and transmitted by priority, according to techniques presented herein. If the bandwidth falls still further below a lower predetermined threshold, yet another priority schema may be employed, with an even smaller number of parameters receiving the highest priority designation.

Figure 9:
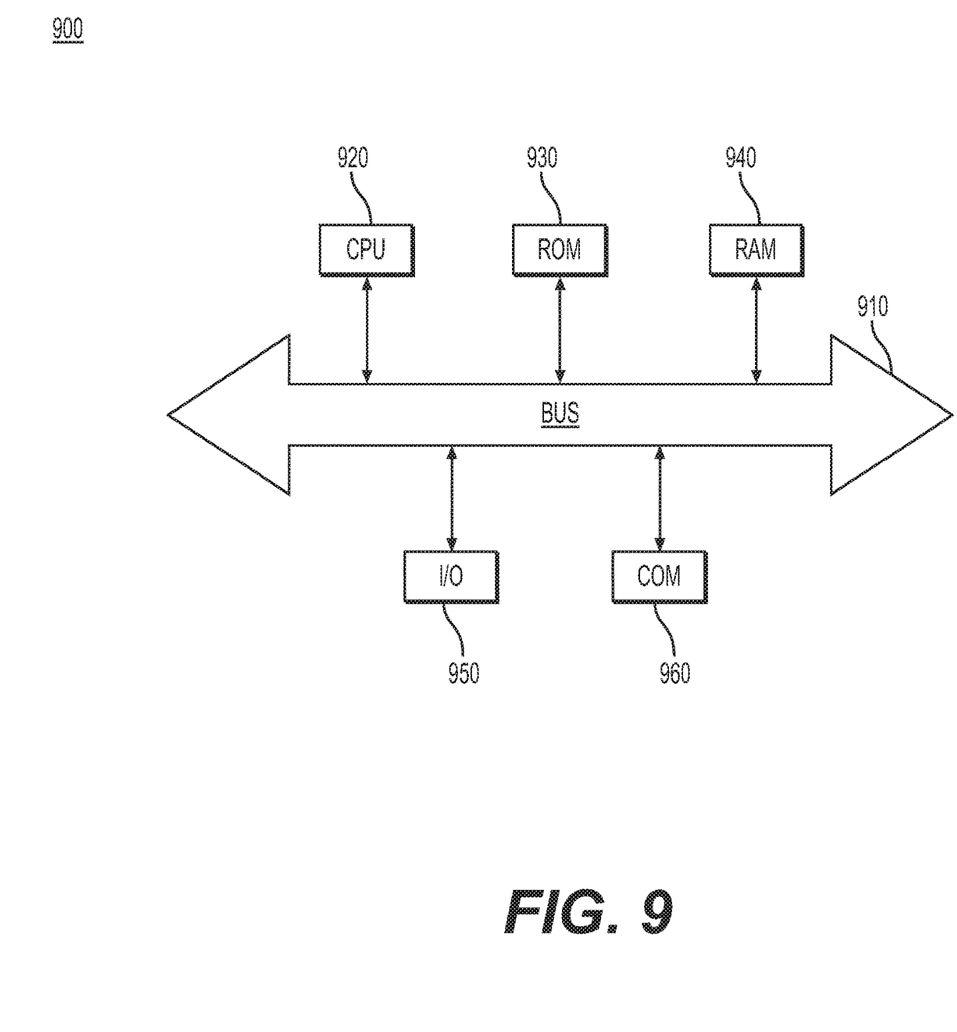
FIG. 9 depicts an exemplary device in which one or more embodiments may be implemented.

FIG. 9 illustrates a high-level functional block diagram of an exemplary device 900, in which embodiments of the present disclosure, or portions thereof, may be implemented, e.g., as computer-readable code. For example, each of the exemplary systems, user interfaces and methods described above with respect to FIGS. 1-8 can be implemented in one or more devices 900 using hardware, software, firmware, tangible computer readable media having instructions stored thereon, or a combination thereof and may be implemented in one or more computer systems or other processing systems. Hardware, software, or any combination of such may implement each of the exemplary systems, user interfaces and methods described above with respect to FIGS. 1-8.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-8 may be implemented using device 900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines.

In addition, in some embodiments the order of operations may be rearranged without departing from the spirit of the disclosed subject matter.

As shown in FIG. 9, device 900 may include a central processing unit (CPU) 920. CPU 920 may be any type of processor device including, for example, any type of special purpose or a general purpose microprocessor device. As will be appreciated by persons skilled in the relevant art, CPU 920 also may be a single processor in a multi-core/multi-processor system, such system operating alone, or in a cluster of computing devices operating in a cluster or server farm. CPU 920 may be connected to a data communication infrastructure 910, for example, a bus, message queue, network, or multi-core message-passing scheme.

Device 900 may also include a main memory 940, for example, random access memory (RAM), and may also include a secondary memory 930. Secondary memory 930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

Device 900 may also include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for prioritized flight data transmission, the method comprising:
   receiving a frame of flight data from one or more aircraft data sensors, the frame of flight data comprising a plurality of parameters collected from one or more avionics systems;
   associating each parameter of the plurality of parameters with a respective priority level;
   decomposing the frame of flight data into a plurality of flight data frame layers, wherein each flight data frame layer of the plurality of flight data frame layers comprises a subset of the plurality of parameters having respective priority levels that are equivalent; and
   transmitting, to a ground station, a first flight data frame layer of the plurality of flight data frame layers comprising parameters having a highest respective priority level.

2. The computer-implemented method of claim 1, wherein the transmission of the first flight data frame layer is by way of a first transmission mode.

3. The computer-implemented method of claim 2, further comprising:
   transmitting, to the ground station, a second flight data frame layer of the plurality of flight data frame layers, the second flight data frame layer comprising parameters having a respective priority level lower than the highest respective priority level, by way of a second transmission mode different from the first transmission mode.

4. The computer-implemented method of claim 1, wherein each flight data frame layer comprises a copy of the frame of flight data in which parameters not included with the flight data frame layer are replaced with a data pattern.

5. The computer-implemented method of claim 1, further comprising:
   clustering the parameters included in each flight data frame layer by moving the included parameters into areas of the flight data frame layer corresponding to parameters not included with the flight data frame layer.

6. The computer-implemented method of claim 1, wherein decomposing the frame of flight data into a plurality of flight data frame layers comprises:
   serially copying each parameter included with each respective flight data frame layer to the respective flight data frame layer such that no empty space is included between the copied parameters.

7. The computer-implemented method of claim 1, wherein the first transmission mode is one of a satellite data stream, a cellular data network, or a direct radio connection.

8. The computer-implemented method of claim 1, further comprising:
   compressing the first flight data frame layer prior to transmitting the first flight data frame layer.

9. A system prioritized flight data transmission, the system comprising:
   a communication module; and
   a real-time access recorder (RTAR) comprising:
      a data storage device storing instructions for prioritized flight data transmission in an electronic storage medium; and a processor configured to execute the instructions to perform a method including:
receiving a frame of flight data from one or more aircraft data sensors, the frame of flight data comprising a plurality of parameters collected from one or more avionics systems;
associating each parameter of the plurality of parameters with a respective priority level;
decomposing the frame of flight data into a plurality of flight data frame layers, wherein each flight data frame layer of the plurality of flight data frame layers comprises a subset of the plurality of parameters having respective priority levels that are equivalent; and
transmitting, to a ground station, a first flight data frame layer of the plurality of flight data frame layers comprising parameters having a highest respective priority level.

10. The system of claim 9, wherein the transmission of the first flight data frame layer is by way of a first transmission mode.

11. The system of claim 10, the performed method further comprising:
transmitting, to the ground station, a second flight data frame layer of the plurality of flight data frame layers comprising, the second flight data frame layer parameters having a respective priority level lower than the highest respective priority level, by way of a second transmission mode different from the first transmission mode.

12. The system of claim 9, wherein each flight data frame layer comprises a copy of the frame of flight data in which parameters not included with the flight data frame layer are replaced with a data pattern.

13. The system of claim 9, the performed method further comprising:
clustering the parameters included in each flight data frame layer by moving the included parameters into areas of the flight data frame layer corresponding to parameters not included with the flight data frame layer.

14. The system of claim 9, wherein decomposing the frame of flight data into a plurality of flight data frame layers comprises:
serially copying each parameter included with each respective flight data frame layer to the respective flight data frame layer such that no empty space is included between the copied parameters.

15. The system of claim 9, wherein the first transmission mode is one of a satellite data stream, a cellular data network, or a direct radio connection.

16. The system of claim 9, the performed method further comprising:
compressing the first flight data frame layer prior to transmitting the first flight data frame layer.

17. A computer-implemented method for prioritized flight data transmission, the method comprising:
receiving a first flight data frame layer and a second flight data frame layer, wherein each of the first and second flight data frame layers comprises one or more parameters having respective priority levels that are equivalent; and
forming a flight data frame by combining the received first flight data frame layer and the received second flight data frame layer.

18. The computer-implemented method of claim 17, wherein the first flight data frame layer is received by way of a first transmission mode and the second flight data frame layer is received by way of a second transmission mode different from the first transmission mode.

19. The computer-implemented method of claim 17, wherein forming the flight data frame comprises overlaying the received second flight data frame layer on the received first flight data frame layer.

20. The computer-implemented method of claim 17, wherein forming the flight data frame comprises:
copying parameters encoded in the received first flight data frame layer into designated locations in the flight data frame; and
copying parameters encoded in the received second flight data frame layer into designated locations in the flight data frame.

* * * * *